Patented Dec. 16, 1952

2,622,064

UNITED STATES PATENT OFFICE 2,622,064

RESINOUS PRODUCTS FOR THE EXCHANGE OR THE REMOVAL OF ANIONS AND SILICA AND METHOD FOR MANUFACTURING SAME

François Maurice Vialatout, Clichy, France, assignor to L'Auxiliaire des Chemins de Fer & de l'Industrie, Vitry-sur-Seine, France, a French body corporate No Drawing. Application November 19, 1949, Serial No. 128,498. In France December 18, 1948

8 Claims. (Cl. 210—24)

1

The present invention relates to new resinous products, the method of preparing same and the uses thereof as anion exchangers or for the removal of silica.

It has already been suggested to use as anion exchangers mixed resinous gels formed of copolymerized condensation products of two or more amine bases and of an aldehyde, containing numerous groups —NH— in their molecule. However, these anion exchangers are ineffective for the removal of the silica or of weak acid anions such as carbonic acid and amino-acids.

On the other hand, it has been suggested to partially remove silica from waters, either by means of a treatment of the water with hydrates of the metals of the third group, or through ion exchangers, small quantities of sodium fluorid being added to the industrial liquid in order to convert the silica into fluosilicic acid, which is retained on the anion exchanger. However, this method does not allow complete removal of the silica.

The invention has for its object to provide new resinous products which, after an alkaline regeneration followed by a washing, possess the property:

(1.) Of retaining anions present in any industrial liquid previously treated by a cation exchanger, including the anions of weak acids and more particularly silica;

(2.) Of retaining the silica in a large quantity in any industrial liquid which is completely demineralized, that is to say after successive treatments with a cation exchanger and an anion exchanger;

(3.) Of dissociating the salts which are present in any industrial liquid and to retain only the anions therefrom (with the exception of the silica) without any previous treatment of the liquid.

Applicant found that the mixed resinuos gels above referred to, when containing groups —NO—, —NO2— or both in their molecule, possess the above indicated properties and, more particularly, provide for the complete removal of the silica contained in any demineralized industrial liquid, through a direct passage over said resinous product, as well as the removal or the exchange of anions of weak acids in said industrial liquids.

The products in accordance with the invention may be used for important industrial applications, and more particularly for feeding high pressure boilers with water, for the total demineralization (including silica) of industrial waters, of sugar

2 juices (with elimination of the formation of glucose), for the purification of alcohols containing traces of acidity, for the removal of salt from sea water, and the like.

The possibility of producing direct dissociation of the salts contained in any liquid and of retaining only the anions thereof permits of eliminating the ebonite lining in the vessels containing the anion exchanger.

The discovery of these new products is an important progress in the direct fixation of silica on the resin, until complete elimination of silica from the liquid to be purified, and said silica may be removed from the resin through regeneration of the product, which may be used again.

The regeneration may be made with an alkaline solution of sodium hydroxide, sodium carbonate, ammonia and the like, followed by a washing step, either with condensation water or with the industrial liquid to be treated, until the regeneration reagent disappears from the effluent. At this moment, the product is ready for any one of the three above-mentioned processes, according to the desired purpose.

Though it is not easy presently to give a theoretical explanation of the part played by the groups —NO— and —NO2— in the elimination of silica for example, it seems that the fixation of silica and regeneration of the product may be explained as follows.

Silica appears to be fixed to the oxygen of the group NO or NO2 according to the following diagram:

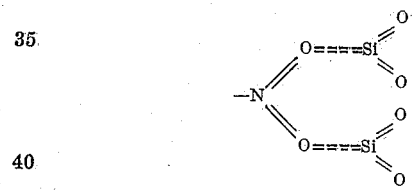

Regeneration seems to result from a kind of hydrolysis, according to the diagram:

viz.:

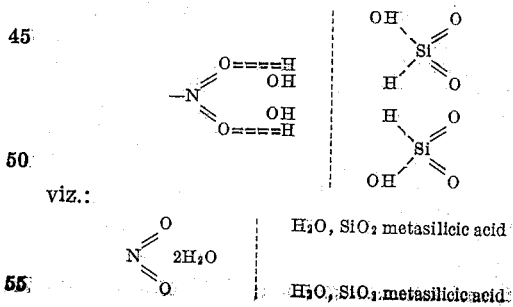

$H_2O$, $SiO_2$ metasilicic acid $H_2O$, $SiO_2$ metasilicic acid

Furthermore, the presence in the resin of numerous groups —NH— existing in the amines condensed with the aldehydes explains the property of the product to exchange or fix the usual anions.

The method for the preparation of these new resinous gels consists in carrying out a first condensation of an amine base with an aldehyde, in adding to said condensate before or during its polymerization, a chemical compound capable of condensing itself with the first condensation product, one or more of the reagents containing in the molecule groups —NO—, —NO$_2$— or both and finally, in completing condensation of the whole, until a gel is obtained, which, after polymerization, yields a resin insoluble in water, in acids and bases and possessing the three above mentioned properties.

The method in accordance with the invention is not limited to the combination of two successive condensations; it may comprise a plurality of condensations in series, each of these condensations consisting in condensing a new chemical compound with the product of the preceding condensation, the gel resulting from these successive condensations being finally subjected to the polymerization.

The starting products for the preparation of these anion exchangers are aldehydes, and aliphatic, aromatic or heterocyclic amines, and the nitro and/or nitroso groups may be present either in the aldehyde molecule or in the amine molecule or both.

The following examples illustrate practical embodiments of the invention without limiting the scope thereof.

*Example 1.*—55 parts of cyanoguanidine, 100 parts of a 30% formaldehyde solution and 10 parts of hydrochloric acid (density 1.19) or the equivalent of a mineral or organic acid, are refluxed during thirty minutes. The whole is allowed to cool down to 60° C. and 200 parts of formaldehyde and 90 parts of nitroguanylurea are added. The mass is refluxed until a gel is obtained, which is polymerized during three days at 80° C. The product obtained, after grinding and screening, possesses the above mentioned properties.

Thus, 1 litre of this product can fix 1.4 kg. of silica in a demineralized water containing 7 milligrams of silica per litre.

*Example 2.*—55 parts of cyanoguanidine, 100 parts of a 30% formaldehyde solution and 10 parts of hydrochloric acid (density 1.19) are refluxed during thirty minutes. The mass is allowed to cool down to 60° C. whereupon 100 parts of formaldehyde and 90 parts of nitroguanylurea are added. The whole is refluxed until the mass reaches a maximum viscosity but the precondensate thus formed is still soluble in 210 parts of formol solution.

On the other hand, 100 parts of metaphenylene diamine are dissolved in 60 parts of hydrochloric acid (density 1.19) and 150 parts of water. This solution and the formol solution just mentioned are cooled down to +2° C. and the precondensate solution is poured into the solution of metaphenylene diamine. The starting temperature of the mixture is 3° C. The mass is carefully stirred and in a few minutes the temperature rises to 58° C. and the mass solidifies to a gel. This gel is left over-night at the room temperature, then polymerization of the mass is continued in an oven at 100° C. during four days. The product is crushed and screened to the desired granulation. When treated with an alkaline solution and washed with condensation water, the product possesses the above mentioned properties.

*Example 3.*—55 parts of cyanoguanidine, 100 parts of a 30% formaldehyde solution and 10 parts of hydrochloric acid (density 1.19) are refluxed during thirty minutes. The whole is allowed to cool down to 60° C. whereupon 200 parts of formaldehyde and 70 parts of nitroguanidine are added; the mass is then refluxed until a gel is obtained. The latter is polymerized during three days at 80° C. and, after grinding and screening the product obtained possesses the above mentioned properties.

*Example 4.*—One proceeds as in Example 3, but refluxing is stopped when the viscosity is a maximum, while the precondensate is still soluble in 200 parts of formaldehyde solution.

On the other hand, 100 parts of metaphenylene diamine are dissolved in 60 parts of hydrochloric acid (density 1.19) and 150 parts of water. This solution and the precondensate solution above mentioned are cooled down to +2° C., the precondensate solution is poured into the solution of metaphenylene diamine and the whole is thoroughly mixed. The temperature rises rapidly and a product is obtained, which is treated as in Example 2, and exhibits the above mentioned properties.

*Example 5.*—Cyanoguanidine and formaldehyde on the one hand and nitroguanylurea and formaldehyde on the other hand are condensed together in the conditions and proportions set forth in Example 1. The solutions of the two precondensates are mixed together and 12 parts of melamine in powder form and 100 parts of formaldehyde are added to the mixture and the whole is refluxed until a gel is obtained, which is dried and ground as above.

*Example 6.*—The procedure is as set forth in Example 5, but the 12 parts of melamine are first dissolved in formaldehyde by refluxing during 30 minutes, and the solution obtained is added to the mixture above referred to.

Of course, the invention is not limited to the above described details which were given only by way of example.

Having now described my invention what I claim as new and desire to secure by Letters Patent is:

1. A mixed resinous gel insoluble in water, acids and bases and capable of retaining anions and silica in any industrial liquid and of exchanging anions consisting of the co-polymerized condensate of cyanoguanidine, formaldehyde and a member of the group consisting of nitroguanidine and nitroguanylurea in substantially equimolecular proportion to cyanoguanidine.

2. A mixed resinous gel insoluble in water, acids and bases and capable of retaining anions and silica in any industrial liquid and of exchanging anions consisting of the co-polymerized condensate of cyanoguanidine, formaldehyde, a member of the group consisting of nitroguanidine and nitroguanylurea in substantially equimolecular proportion to cyanoguanidine, and metaphenylene diamine.

3. A mixed resinous gel insoluble in water, acids and bases and capable of retaining anions and silica in any industrial liquid and of exchanging anions consisting of the co-polymerized condensate of cyanoguanidine, formaldehyde, a member of the group consisting of nitroguanidine and nitroguanylurea in substantially equimolecular proportion to cyanoguanidine, and melamine.

4. A method for the exchange of anions and the removal of silica from liquids containing same, which consists in contacting said liquid with a mixed resinous gel, consisting of the co-polymerized condensate of cyanoguanidine, formaldehyde and a member of the group consisting of nitroguanidine and nitroguanylurea in substantially equimolecular proportion to cyanoguandine.

5. A method for the preparation of resinous gels for the exchange or removal of anions and silica from liquids, which comprises carrying out a first condensation of cyanoguanidine with formaldehyde in an aqueous solution, adding to the condensate on the one hand a nitro compound selected from the group consisting of nitro guanidine and nitroguanylurea, said nitro compound being in substantially equimolecular proportion to cyanoguanidine, and on the other hand a further quantity of aqueous formaldehyde in an amount necessary to condense with said nitro compound, the first condensation being continued to a point where the first condensate is still soluble in said further quantity of aqueous formaldehyde, and condensing the whole until a gel is obtained which is polymerised into a resin insoluble in water, in the acids and bases.

6. A method for the preparation of a resinous gel for the exchange or removal of anions and silica from liquids, which comprises carrying out a first condensation of 55 parts of cyanoguanidine and 100 parts of a 30% formaldehyde aqueous solution, adding to the condensate 90 parts of nitroguanylurea and 200 parts of a 30% formaldehyde aqueous solution, the first condensation being continued to a point where the first condensate is still soluble in said 200 parts of a 30% formaldehyde aqueous solution, adding to the mixture thus obtained 12 parts of melamine and 100 parts of a 30% formaldehyde aqueous solution, and condensing the whole until a gel is obtained which is polymerised into a resin insoluble in water, in the acids and bases.

7. A mixed resinous gel insoluble in water, acids and bases and capable of retaining anions and silica in any industrial liquid and of exchanging anions, consisting of the co-polymerized condensate of 55 parts of cyanoguanidine, 400 parts of a 30% formaldehyde aqueous solution, 90 parts of nitroguanylurea, and 12 parts of melamine.

8. A method for the exchange of anions and the removal of silica from liquids containing same, which consists in contacting said liquid with a mixed resinous gel, consisting of the co-polymerized condensate, of 55 parts of cyanoguanidine, 400 parts of a 30% formaldehyde aqueous solution, 90 parts of nitroguanylurea, and 12 parts of melamine.

FRANÇOIS MAURICE VIALATOUT.

REFERENCES CITED

The following references are of record in the file of this patent:

UNITED STATES PATENTS

| Number | Name | Date |
|---|---|---|
| 1,780,636 | Stine | Nov. 4, 1930 |
| 2,246,527 | Melof | June 24, 1941 |
| 2,263,289 | D'Alelio | Nov. 18, 1941 |
| 2,285,750 | Swain | June 9, 1942 |
| 2,442,989 | Sussman | June 8, 1948 |
| 2,492,855 | Fox | Dec. 27, 1949 |